(12) United States Patent
Bannon

(10) Patent No.: US 8,066,481 B2
(45) Date of Patent: Nov. 29, 2011

(54) BALANCING A RAM AIR TURBINE

(75) Inventor: David G. Bannon, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 418 days.

(21) Appl. No.: 12/426,316

(22) Filed: Apr. 20, 2009

(65) Prior Publication Data

US 2010/0266404 A1 Oct. 21, 2010

(51) Int. Cl.
 *F01D 7/00* (2006.01)
(52) U.S. Cl. .................... 416/51; 416/157 R
(58) Field of Classification Search .............. 416/51, 416/53, 137, 157 R
See application file for complete search history.

(56) References Cited

U.S. PATENT DOCUMENTS

| | | | |
|---|---|---|---|
| 2,583,369 A | 1/1952 | Fumagalli | |
| 2,955,656 A | 10/1960 | Balje et al. | |
| 3,013,613 A | 12/1961 | Blackburn | |
| 4,692,093 A * | 9/1987 | Safarik | 416/1 |
| 4,743,163 A | 5/1988 | Markunas | |
| 7,074,010 B2 * | 7/2006 | DeGroff et al. | 416/46 |

* cited by examiner

*Primary Examiner* — Chandra Chaudhari
(74) *Attorney, Agent, or Firm* — Stephen G. Mican

(57) ABSTRACT

A method of balancing a ram air turbine that has a turbine shaft with a turbine shaft axis, a rotor attached to the shaft, rotor blades attached to the rotor that move between a fine pitch and coarse pitch position, a spring-loaded governor for controlling the position of the blades that has its springing retained by a stationary outer spring seat and a movable inner yoke plate that slides on the turbine shaft and whose position determines blade pitch, comprises the steps of: pulling the yoke plate toward the spring seat to displace the yoke plate toward the spring seat sufficiently to cause the rotor blades to assume a desired degree of pitch; spinning the turbine shaft at a desired rotational speed; balancing the rotor to minimize vibration of the rotor with the desired rotor blade pitch and turbine shaft speed; and releasing the pull of the yoke plate toward the spring seat.

25 Claims, 5 Drawing Sheets

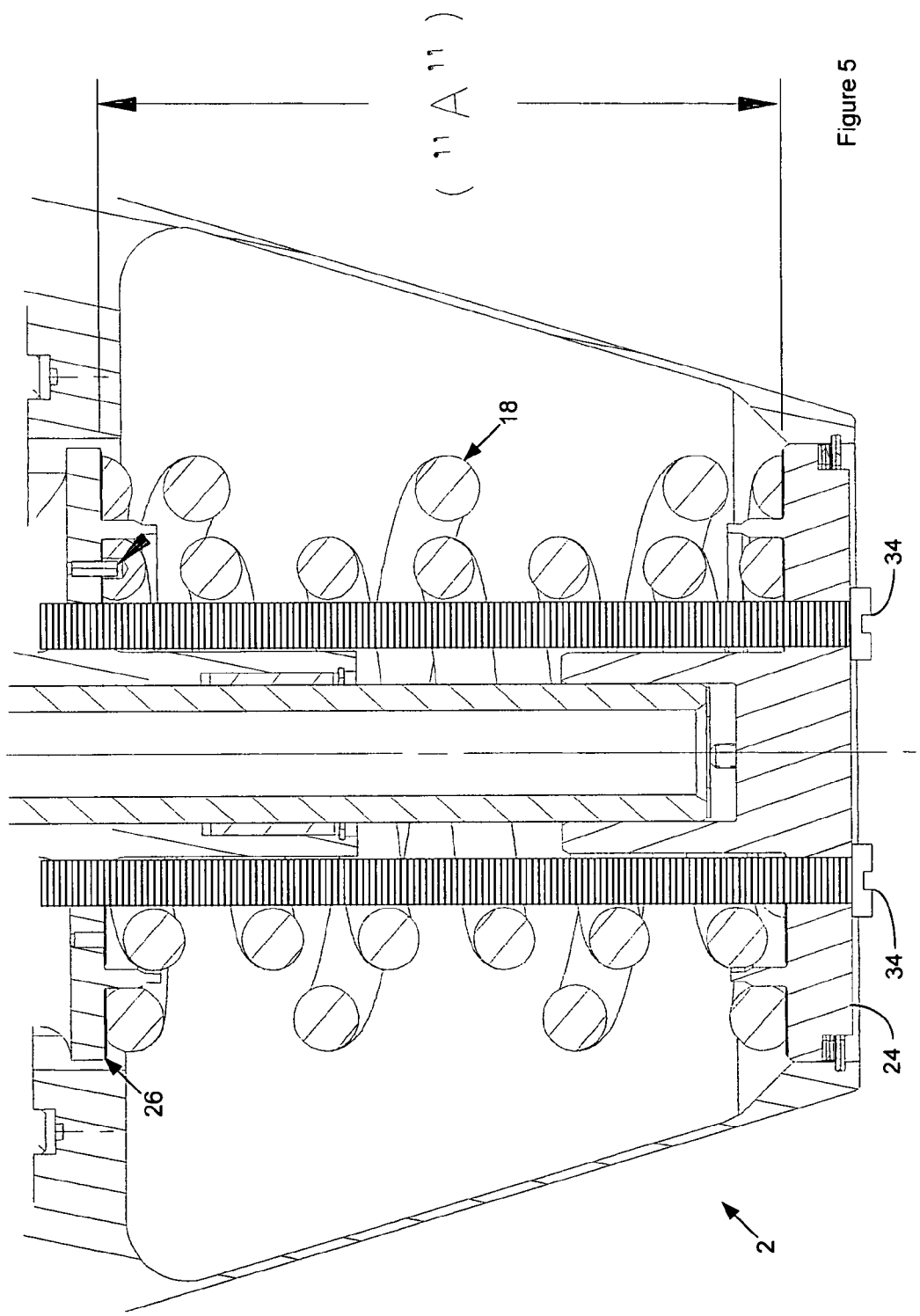

US 8,066,481 B2

BALANCING A RAM AIR TURBINE

FIELD OF THE INVENTION

The invention relates to ram air turbines for generating emergency supplemental power in aeronautical applications, and more particularly to a method of balancing the rotor of a ram air turbine that maintains best balance over its operating range.

BACKGROUND OF THE INVENTION

A ram air turbine (RAT) is a device for generating emergency supplemental power in a wide variety of aircraft. A RAT may generate hydraulic power, electric power or both. A RAT incorporates a turbine that extracts power from an air stream proximate the aircraft in flight. U.S. Pat. No. 4,743,163 to Markunas et al., owned by the assignee of this application, and incorporated herein by reference, describes a typical RAT in current use. The turbine is coupled to suitable power generating equipment, such as a hydraulic pump for hydraulic power, an electric generator for electric power, or both in the case of a hybrid RAT.

As described in Markunas et al., the turbine includes a speed governor that changes the turbine blade position to maintain a relatively constant shaft speed to the power generating equipment. Upon assembly, it is necessary to balance the turbine rotor to minimise vibration. This involves rotating the rotor on a test stand at a relatively low speed that does not cause the blades to shift from their low speed, fine pitch position. Unfortunately, as the rotor increases in speed, the balance of the rotor shifts to some degree due to the shift in position of the turbine blades from a fine pitch to a coarse pitch and due to compression of the main governor springs.

It would be advantageous to balance the rotor at an intermediate speed, wherein the blades would have an intermediate pitch, so that the maximum imbalance would be reduced by approximately one-half. However, the power that the test stand would need to rotate the rotor at the combination of intermediate pitch and speed makes this an impractical proposition.

SUMMARY OF THE INVENTION

The invention generally comprises a method of balancing a ram air turbine that has a turbine shaft with a turbine shaft axis, a rotor attached to the shaft, rotor blades attached to the rotor that move between a fine pitch and coarse pitch position, a spring-loaded governor for controlling the position of the blades that has its springing retained by a stationary outer spring seat and a movable inner yoke plate that slides on the turbine shaft and whose position determines blade pitch, comprising the steps of: pulling the yoke plate toward the spring seat to displace the yoke plate toward the spring seat sufficiently to cause the rotor blades to assume a desired degree of pitch; spinning the turbine shaft at a desired rotational speed; balancing the rotor to minimise vibration of the rotor with the desired rotor blade pitch and turbine shaft speed; and releasing the pull of the yoke plate toward the spring seat.

DESCRIPTION OF THE DRAWINGS

FIG. 5 is a partial cut-away top view of the RAT shown in FIG. 1 that illustrates adjustment screws placed through the spring seat holes and engaging the yoke plate holes.

DETAILED DESCRIPTION OF THE INVENTION

Figure 1:
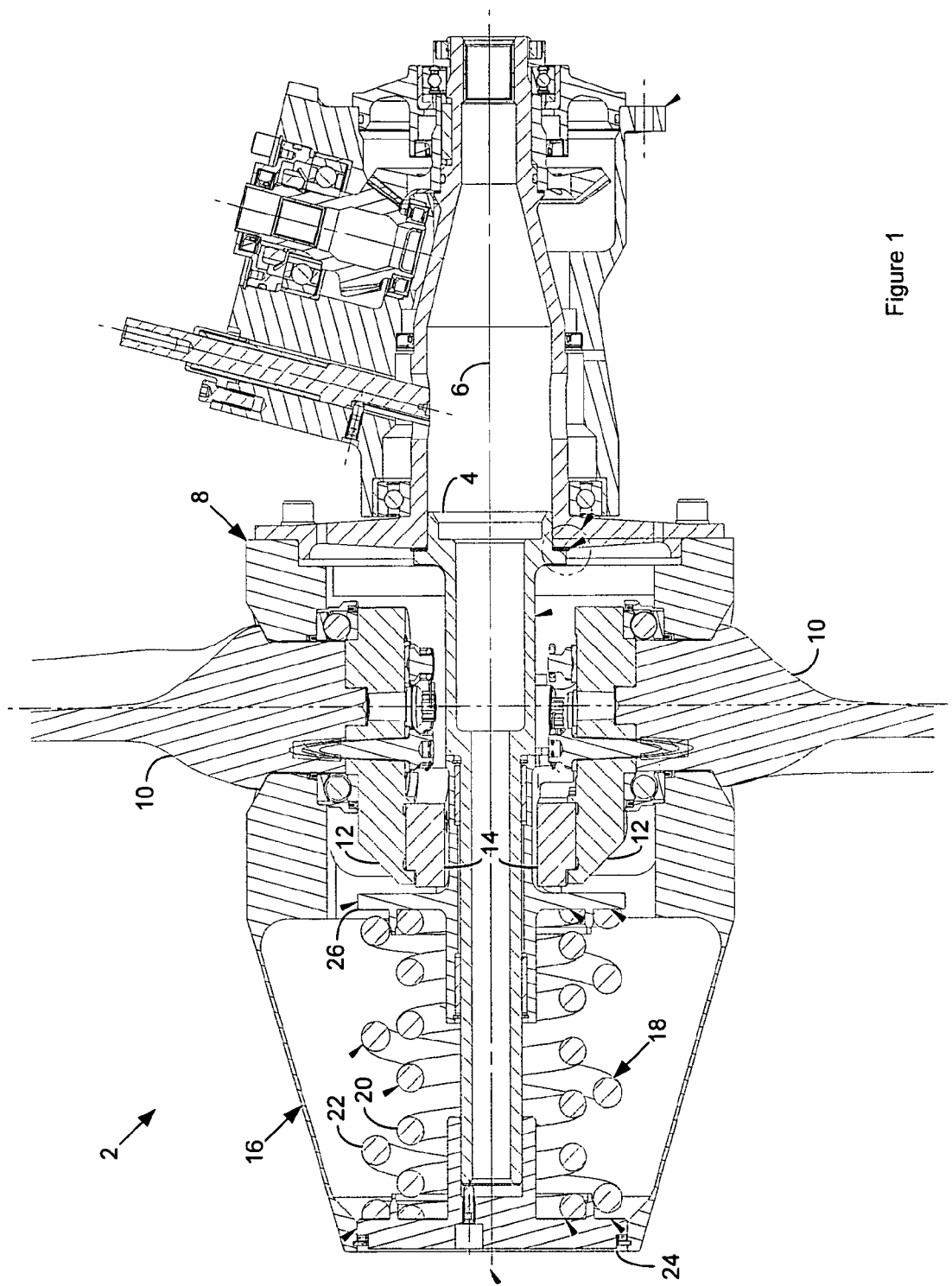
FIG. 1 is a cut-away side view of a RAT that is suitable for incorporating at least one possible embodiment of the invention.
Figure 2:
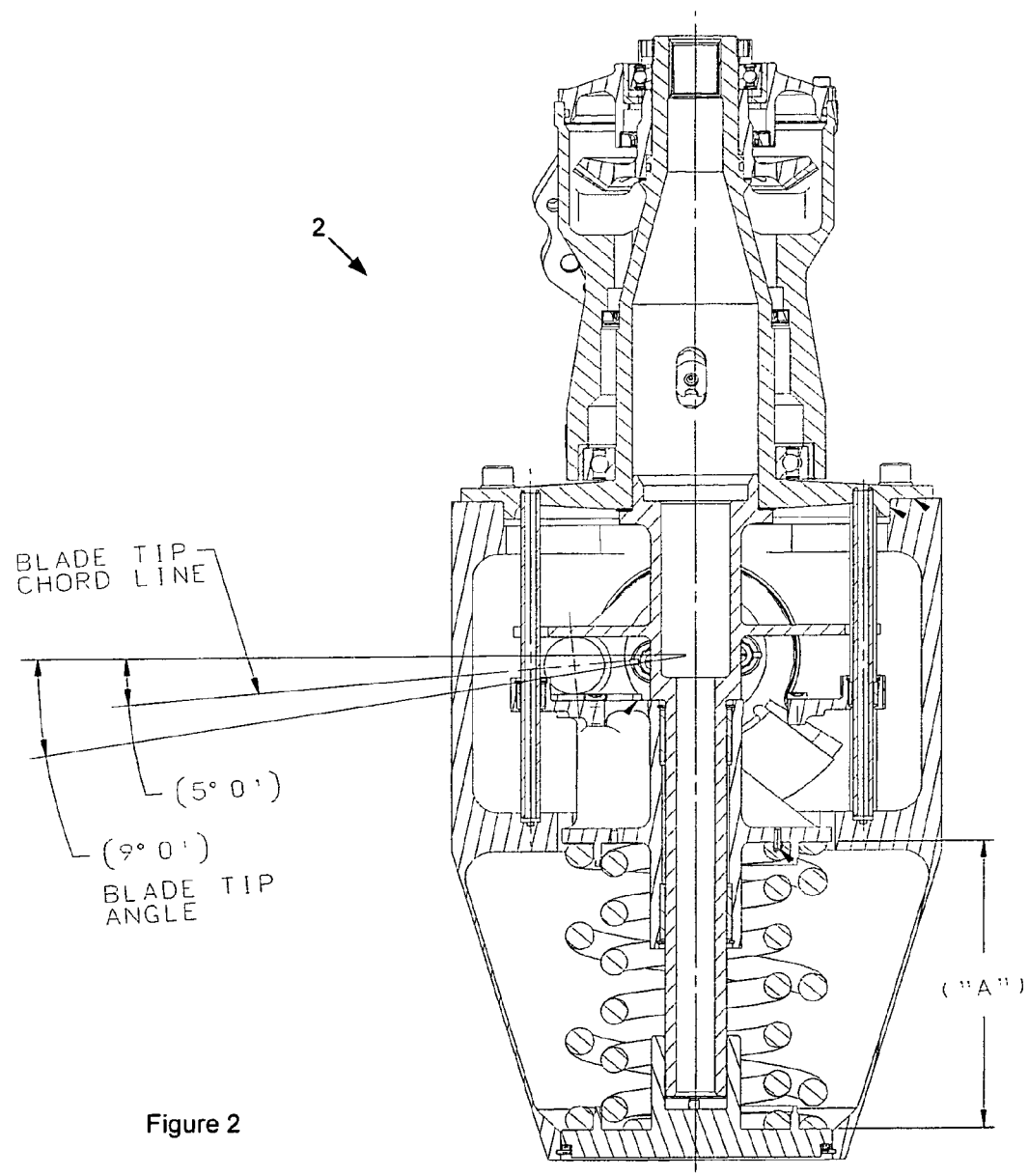
FIG. 2 is a first cut-away top view of the RAT shown in FIG. 1 in a fine pitch position.
Figure 3:
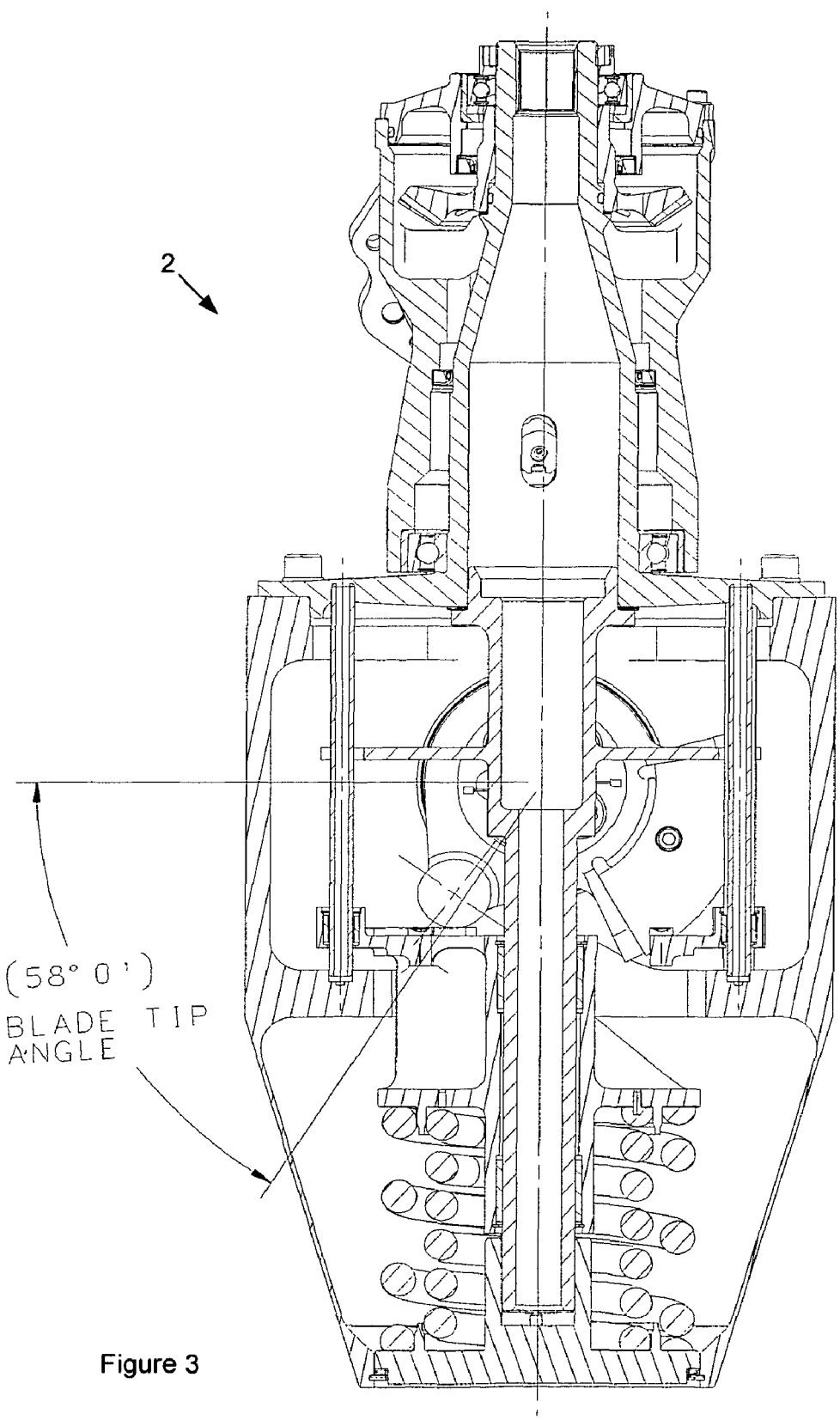
FIG. 3 is a second cut-away top view of the RAT shown in FIG. 1 in a coarse pitch position.

FIG. 1 is a cut-away side view of a ram air turbine (RAT) 2 that is suitable for incorporating at least one possible embodiment of the invention. FIG. 2 is a first cut-away top view of the RAT 2 shown in FIG. 1 in a fine pitch position. FIG. 3 is a second cut-away top view of the RAT 2 shown in FIG. 1 in a coarse pitch position. Markunas et al. describes the general operation of such a RAT 2 in detail. Basically, as a turbine shaft 4 rotates about a turbine shaft axis 6, it rotates a rotor 8 attached thereto. Rotor blades 10 attached to the rotor 8 are able to rotate between a fine pitch position, as shown in FIG. 2, and a coarse pitch position, as shown in FIG. 3. For purposes of illustration only, FIG. 2 shows a fine pitch position of approximately 9 degrees and FIG. 3 shows a coarse pitch position of approximately 58 degrees.

A rotor flyweight assembly 12 for each rotor blade 10 serves to act on its rotor blade 10 as the rotor 8 rotates on the turbine shaft 4 by means of an associated flyweight 14. A spring-loaded governor assembly 16 for controlling the position of the rotor blades 10 that has its springing, represented by a coaxial spring set 18 with an inner spring 20 and an outer spring 22, retained by a stationary outer spring seat 24 and a movable inner yoke plate 26 that slides on the turbine shaft 4 to counteract the action of the flyweight assemblies 12.

As the speed of the rotor 8 increases, the force of the flyweight assemblies 12 increases, causing the positions of the corresponding rotor blades 10 to shift in pitch and push on the yoke plate 26 to compress the spring set 18 between the yoke plate 26 and the spring seat 24, thus changing the length of the spring set 18, as represented by dimension "A" in FIG. 2. This increases the force of the spring set 18 to balance the force of the flyweight assemblies 12 for any rotational speed of the rotor 8 within the operational range of the RAT 2. Consequently, this force balance arrangement causes the rotor blades 10 to assume increasing pitch with increasing speed of the turbine shaft 4.

Upon assembly or rebuild of the RAT 2, it is necessary to balance the rotor 8 to minimise vibration. Balancing the rotor 8 involves rotating the turbine shaft 4 at a desired speed and adding balance weights to the rotor 8 to minimise vibration. Unfortunately, the position or pitch of the rotor blades 10 and components of the governor assembly 16 tends to alter the dynamic balance of the rotor 8. In many instances, it would be desirable to balance the rotor 8 at a speed within its operating range such that the rotor blades 10 would assume a generally mid-range position to limit imbalance at both the fine and coarse positions of the rotor blades 10. In other instances, when the rotor 8 has a characteristic resonant frequency that corresponds to a pitch of the rotor blades 10 between the fine and coarse positions, it would be desirable to balance the rotor 8 at a speed such that the rotor blades 10 would assume the resonant frequency pitch position to minimise imbalance at the resonant frequency of the rotor 8.

However, neither of these opportunities has been feasible because of test stand power requirements. The power needed to drive the turbine shaft 4 at the speeds necessary to achieve mid-range or resonant frequency pitch of the rotor blades would be substantial and impractical. Instead, balancing the RAT 2 with a reasonable level of test stand power has involved balancing the rotor 8 whilst spinning the turbine shaft 4 at a speed low enough to prevent the rotor blades 10 from shifting from the fine pitch position and low enough to limit the amount of aerodynamic drag on the rotor blades 10. Unfortunately, this means that imbalance of the rotor 8 increases with increasing speed of the rotor 8 over its operating range.

Figure 4:
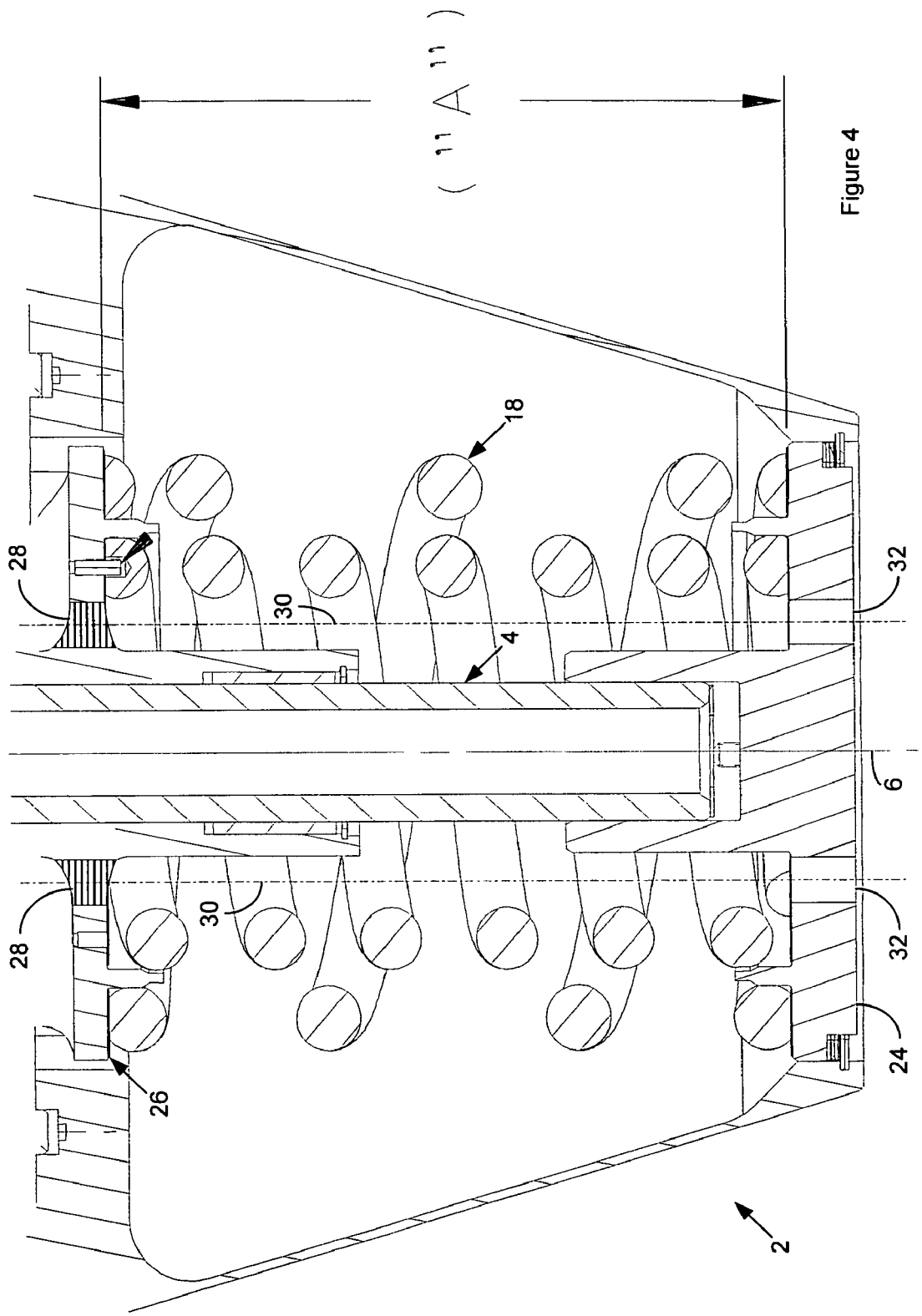
FIG. 4 is a partial cut-away top view of the RAT shown in FIG. 1 that illustrates holes in a yoke plate and a spring seat for the RAT.

According to a possible embodiment of the invention, it is possible to manually adjust the rotor blades 10 to any desired position and then perform balancing of the rotor 8 at any desired speed of the turbine shaft within the power limits of the test stand. The first step of the balancing process is pulling the yoke plate 26 toward the spring seat 24 to displace the yoke plate 26 toward the spring seat 24 sufficiently to cause the rotor blades 10 to assume a desired degree of pitch. Referring to FIG. 4, the implementation of this step may comprise inserting or forming N, but at least two, threaded yoke plate holes 28 passing through the inner yoke plate 26 that have positions symmetrically spaced about the turbine shaft 4 and yoke plate hole axes 30 in parallel with the turbine shaft axis 6. There may be two yoke plate holes 28 with approximately 180 degrees of separation about the turbine shaft axis, such as shown in FIG. 4, or additional ones, such as N yoke plate holes 28 with approximately 360/N degrees of separation about the turbine shaft axis. The important point is that the positioning of the yoke plate holes around the yoke plate is symmetrical relative to the turbine shaft axis 6, to maintain balance and insure free movement of the yoke plate 26.

The implementation of the first step may further comprise inserting or forming spring seat holes 32 passing through the spring seat 24 that correspond to the yoke plate holes 28 and have spring seat hole axes in alignment with the yoke plate hole axes 30. Referring to FIG. 5, the implementation of the first step may additionally comprise inserting an adjustment screw 34 through each spring seat hole 32 that has a screw head larger than the spring seat hole 32, a length sufficient to penetrate its corresponding yoke plate hole and a thread matched to engage the thread of its corresponding yoke plate hole.

The implementation of the first step may still further comprise tightening each adjustment screw 34 to displace the yoke plate 26 toward the spring seat 24 sufficiently to cause the rotor blades 10 to assume a desired degree of pitch. As already explained, this desired degree of pitch may be a generally mid-range position, such as approximately midway between the fine pitch and coarse pitch positions, to limit imbalance at both the fine and coarse positions of the rotor blades 10. Alternatively, when the rotor 8 has a characteristic resonant frequency that corresponds to a pitch of the rotor blades 10 between the fine and coarse positions, the desired degree of pitch may be the resonant frequency pitch position to minimise imbalance at the resonant frequency of the rotor 8.

The second step of the balancing process is to spin the turbine shaft 4 at a desired speed, which may be as high as practical to detect vibration and minimise test stand dynamic interactions but at a speed that does not exceed the power capability of the test stand. The third step of the balancing process is to balance the rotor 8 to minimise vibration of the rotor 8 with the desired rotor blade pitch and turbine shaft speed. The implementation of this step may comprise adding mass to the rotor 8 about the turbine shaft axis 6, such as with balance weights, or removing mass from the rotor 8 about the turbine shaft axis 6, such as by shaving or grinding. The last step of the balancing process is to release the pull of the yoke plate 26 toward the spring seat 24. The implementation of this step may comprise removing the adjustment screws 34 from the yoke plate 26 and spring seat 24. This balancing process permits manual adjustment of the position of the rotor blades 10 between the fine pitch position and the coarse pitch position to any desired pitch whilst permitting the test stand to drive the turbine shaft 4 at any desired speed within its power limitations for optimum balance of the rotor 8.

Of course, the implementation of the steps of pulling the yoke plate 26 toward the spring seat to displace the yoke plate toward the spring seat 24 and releasing the pull of the yoke plate toward the spring seat may be by way of other means, such as by other types of clamping or engagement devices that will allow manual adjustment of the rotor blades 10 to assume a desired degree of pitch during the balancing process. The described embodiments of the invention are only some illustrative implementations of the invention wherein changes and substitutions of the various parts and arrangement thereof are within the scope of the invention as set forth in the attached claims.

The invention claimed is:

1. A method of balancing a ram air turbine that has a turbine shaft with a turbine shaft axis, a rotor attached to the shaft, rotor blades attached to the rotor that move between a fine pitch and coarse pitch position, a spring-loaded governor for controlling the position of the blades that has its springing retained by a stationary outer spring seat and a movable inner yoke plate that slides on the turbine shaft and whose position determines blade pitch, comprising the steps of:
    pulling the yoke plate toward the spring seat to displace the yoke plate toward the spring seat sufficiently to cause the rotor blades to assume a desired degree of pitch;
    spinning the turbine shaft at a desired rotational speed;
    balancing the rotor to minimise vibration of the rotor with the desired rotor blade pitch and turbine shaft speed; and
    releasing the pull of the yoke plate toward the spring seat.

2. The method of claim 1, wherein the desired degree of rotor blade pitch is approximately midway between the fine pitch and coarse pitch positions.

3. The method of claim 1, wherein the rotor has a resonant frequency that corresponds to a rotor blade pitch and the desired degree of rotor blade pitch approximates the resonant frequency rotor blade pitch.

4. The method of claim 1, wherein the desired rotational speed is less than needed to shift the position of the rotor blades from the fine pitch position.

5. The method of claim 1, wherein the step of pulling the yoke plate toward the spring seat comprises pulling the yoke plate at symmetrically spaced points around the yoke plate relative to the turbine shaft axis.

6. The method of claim 5, wherein the step of pulling the yoke plate toward the spring seat at symmetrically spaced points comprises the step of spacing N of the points with approximately 360/N degrees of separation about the turbine shaft axis.

7. The method of claim 1, wherein the step of balancing the rotor comprises adding mass to the rotor about the turbine shaft axis.

8. The method of claim 1, wherein the step of balancing the rotor comprises removing mass from the rotor about the turbine shaft axis.

9. A method of balancing a ram air turbine that has a turbine shaft with a turbine shaft axis, a rotor attached to the shaft, rotor blades attached to the rotor that move between a fine pitch and coarse pitch position, a spring-loaded governor for controlling the position of the blades that has its springing retained by a stationary outer spring seat and a movable inner yoke plate that slides on the turbine shaft and whose position determines blade pitch, comprising the steps of:

pulling the yoke plate toward the spring seat to displace the yoke plate toward the spring seat sufficiently to cause the rotor blades to assume a pitch approximately midway between the fine pitch and coarse pitch positions;

spinning the turbine shaft at a desired rotational speed;

balancing the rotor to minimise vibration of the rotor with the desired rotor blade pitch and turbine shaft speed; and releasing the pull of the yoke plate toward the spring seat.

10. The method of claim 9, wherein the desired rotational speed is less than needed to shift the position of the rotor blades from the fine pitch position.

11. The method of claim 9, wherein the step of pulling the yoke plate toward the spring seat comprises pulling the yoke plate at symmetrically spaced points around the yoke plate relative to the turbine shaft axis.

12. The method of claim 11, wherein the step of pulling the yoke plate toward the spring seat comprises the step of spacing N of the points with approximately 360/N degrees of separation about the turbine shaft axis.

13. The method of claim 9, wherein the step of balancing the rotor comprises adding mass to the rotor about the turbine shaft axis.

14. The method of claim 9, wherein the step of balancing the rotor comprises removing mass from the rotor about the turbine shaft axis.

15. A method of balancing a ram air turbine that has a turbine shaft with a turbine shaft axis, a rotor attached to the shaft, rotor blades attached to the rotor that move between a fine pitch and coarse pitch position, a spring-loaded governor for controlling the position of the blades that has its springing retained by a stationary outer spring seat and a movable inner yoke plate that slides on the turbine shaft and whose position determines blade pitch, comprising the steps of:

pulling the yoke plate toward the spring seat to displace the yoke plate toward the spring seat sufficiently to cause the rotor blades to assume a pitch that approximates a rotor blade pitch at which the rotor has a resonant frequency;

spinning the turbine shaft at a desired rotational speed;

balancing the rotor to minimise vibration of the rotor with the desired rotor blade pitch and turbine shaft speed; and releasing the pull of the yoke plate toward the spring seat.

16. The method of claim 15, wherein the desired rotational speed is less than needed to shift the position of the rotor blades from the fine pitch position.

17. The method of claim 15, wherein the step of pulling the yoke plate toward the spring seat comprises pulling the yoke plate at symmetrically spaced points around the yoke plate relative to the turbine shaft axis.

18. The method of claim 17, wherein the step of pulling the yoke plate toward the spring seat comprises the step of spacing N of the points with approximately 360/N degrees of separation about the turbine shaft axis.

19. The method of claim 15, wherein the step of balancing the rotor comprises adding mass to the rotor about the turbine shaft axis.

20. The method of claim 15, wherein the step of balancing the rotor comprises removing mass from the rotor about the turbine shaft axis.

21. A ram air turbine that has a turbine shaft with a turbine shaft axis, a rotor attached to the shaft, rotor blades attached to the rotor that move between a fine pitch and coarse pitch position, a spring-loaded governor for controlling the position of the blades that has its springing retained by a stationary outer spring seat and a movable inner yoke plate that slides on the turbine shaft and whose position determines blade pitch, comprising:

threaded yoke plate holes passing through the yoke plate that have symmetrically spaced positions around the yoke plate relative to the turbine shaft axis and yoke plate hole axes in parallel with the turbine shaft axis; and spring seat holes passing through the spring seat that correspond to the yoke plate holes and have spring seat hole axes in alignment with the yoke plate hole axes.

22. The ram air turbine of claim 21, wherein the spring seat holes receive and the threaded yoke plate holes engage corresponding adjustment screws that may selectively pull the yoke plate toward the spring seat to displace the yoke plate toward the spring seat sufficiently to cause the rotor blades to assume a desired degree of pitch.

23. The ram air turbine of claim 22, wherein the desired degree of rotor blade pitch is approximately midway between the fine pitch and coarse pitch positions.

24. The ram air turbine of claim 22, wherein the rotor has a resonant frequency that corresponds to a rotor blade pitch and the desired degree of rotor blade pitch approximates the resonant frequency rotor blade pitch.

25. The ram air turbine of claim 21, wherein the yoke plate has N of the yoke plate holes and the positions of the yoke plate holes have approximately 360/N degrees of separation about the turbine shaft axis.

\* \* \* \* \*